W. S. O'BRIEN.

Harrow.

No. 6,606.

Reissued Aug. 24, 1875.

Witnesses:

P. R. Richards.

A. B. Moulton

Inventor:

William S. O'Brien,

By W. B. Richards, Atty.

N. PETERS, PHOTO-LITHOGRAPHER, WASHINGTON, D. C.

UNITED STATES PATENT OFFICE.

WILLIAM S. O'BRIEN, OF KEWANEE, ILLINOIS, ASSIGNOR TO THE O'BRIEN BROTHERS' MANUFACTURING COMPANY.

IMPROVEMENT IN HARROWS.

Specification forming part of Letters Patent No. 155,543, dated September 29, 1874; reissue No. 6,606, dated August 24, 1875; application filed July 7, 1875.

*To all whom it may concern:*

Be it known that I, WILLIAM S. O'BRIEN, of Kewanee, county of Henry and State of Illinois, have invented certain Improvements in Harrows, of which the following is a specification:

The nature of this invention relates to improvements in that class of harrows which are made in sections, connected to each other by eyebolts and a coupling-rod; and the invention consists in making the coupling-rod with a loop or crook, which may be engaged with a hook on one of the sections, to retain it in place, and may be released therefrom simply by turning it, all as hereinafter fully described.

To enable others skilled in the art to make and use my invention, I will proceed to describe the same with reference to the accompanying drawings, in which—

Figure 2:
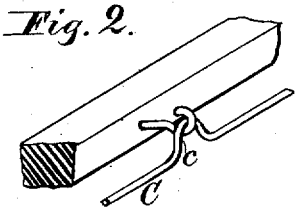
Figure 1:
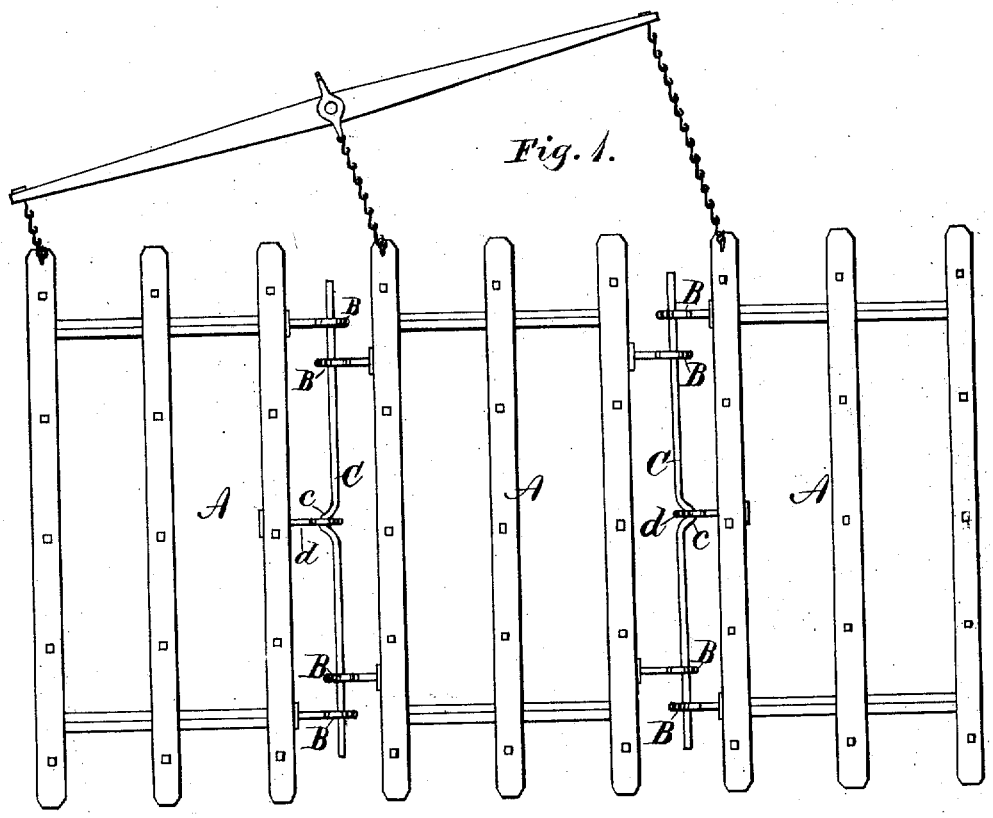

Figure 1 is a top plan view of a harrow embodying my invention, and Fig. 2 is a detail perspective view, showing manner of securing the coupling-rod.

Like letters in both figures of the drawings indicate like parts.

Referring to the parts by letters, letters A A A represent three harrows, constructed and provided with teeth in any ordinary manner. B B are eyebolts attached to each harrow near its end, as shown at Fig. 1. C is the coupling-rod, which is passed through the adjacent eyes B, and is held in place after it is inserted through the said eyes by means of being turned so as to cause a loop or crook, *c*, thereon, to engage with a hook, *d*, which projects from one side of one of the harrows or sections, which form the tripartite harrow. It will be plainly seen that this method of securing the coupling-rod C in place will admit of its being readily and easily removed, when desired, to separate the sections for loading onto any vehicle or for other purposes, and also permit of readily securing the parts in place again. The draft-bar D is attached to the sections similar to its attachment, as shown in Letters Patent No. 55,351, granted to me June 5, 1866.

I claim—

The coupling-rod C, having a crook or loop, *c*, arranged to operate with a hook, *d*, for securing said coupling-rod in the eyes B B and the harrow sections to each other, substantially as described, and for the purpose specified.

WILLIAM S. O'BRIEN.

Witnesses:
LEVI NORTH,
MILO NORTH.

BEST AVAILABLE COPY